Figure 1:
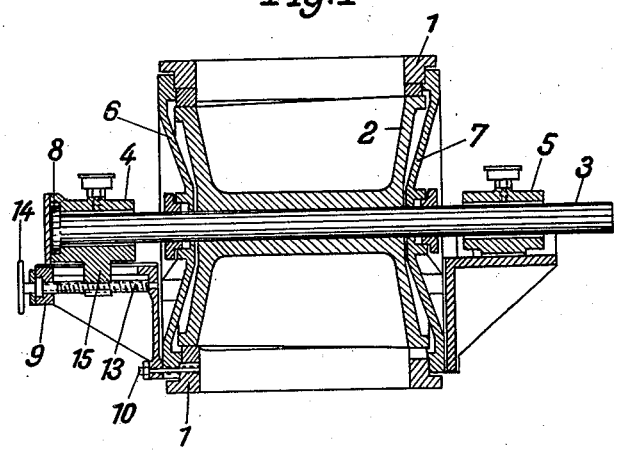

Nov. 10, 1942.　　B. HOLTZMANN　　2,301,405
FEED WHEEL AND CASING
Filed Dec. 2, 1938

Inventor:
B. Holtzmann

UNITED STATES PATENT OFFICE 2,301,405

FEED WHEEL AND CASING

Bernhard Holtzmann, Herne, Germany; vested in the Alien Property Custodian

Application December 2, 1938, Serial No. 243,677
In Germany August 26, 1938

1 Claim. (Cl. 221—136)

In blower refuse machines it is known to make the pocket wheel conical and axially adjustable. By this means the end walls of the pocket wheel can always be circular and caused to bear tightly against the casing wall to compensate the wear occurring in service.

To effect the adjustment of the pocket wheel a screw thread is provided on one end of the shaft projecting from a bearing in the rigid casing and by screwing and fixing nuts thereon. By tightening the nuts against the bearing, the shaft and therefore the pocket wheel can be adjusted in the casing. This make-shift construction, however, requires that the shaft is axially shiftable in its bearings and can also be adjusted only when the machine is at a standstill.

Consequently, it has been proposed to mount the pocket wheel shaft in a neck-journal bearing in such a manner that the adjustment of the pocket can only be effected by axial displacement of the bearing. For this purpose the bearing is arranged on a bracket fixed on the machine casing and equipped with laterally projecting ribs, on both sides of which pressure screws, arranged laterally below the pocket wheel shaft, act eccentrically to the axis of the bearing. The pressure screws are rotatable in cams on the bracket, which cams act as locking nuts. Altogether at least four screws are required for fixing the bearing.

This method of adjusting the pocket wheel takes a relatively long time because each of the pressure screw nuts must be adjusted for making each adjustment and is inconvenient because the nuts must all be tightened as far as possible at the same time.

However, it has also been suggested for readjusting the pocket wheel, to fit a collar on the pocket wheel shaft on the outside of the transverse bearing, to fix on the housing a tubular, screw threaded extension surrounding the collar and to screw on this extension an internally screw thread sleeve whose end face bears against the collar. By turning this screw sleeve the end face thereof is connected with the collar on the shaft so that the pocket wheel can be adjusted. This construction of the adjusting device is, however, based on an entirely different principle in which the bearing is rigidly fixed in the casing cover so that the shaft must be axially shifted in the bearing during the re-adjustment. The result of this is that during the re-adjustment unfavourable or unequal stresses occur in the bearing owing to the pulling of the unworn portion of the shaft into the bearing.

The invention relates to devices of this type in which the re-adjusting of the pocket wheel by axial displacement of a bearing carrying the pocket wheel, which bearing is secured against rotation in rigid guides in the casing, is effected by adjusting means provided with screw threads and engaging eccentrically to the centre of the bearing. The doubts at first raised against such adjusting means, that the bearing would skew owing to the eccentric engagement of the adjusting means, have been found to be unwarranted as, if the bearing has good axial guiding, it cannot skew. By the invention the construction of such a bearing and at the same time the displacement thereof for the purpose of re-adjusting the pocket wheel, is considerably simplified and improved in that the bearing element has a screw threaded bore extending parallel to the axis of the bearing, in which bore a rotatable screw spindle secured against displacement in the rigid casing is arranged and guided. When the screw spindle is rotated, the bearing rides on this spindle and is reliably guided in its rigid guides so that it cannot skew. The guides for the bearing element secured against rotation have flat surfaces and are easily exchangeable. The screw threaded bore in the bearing element for receiving the screw spindle and the spindle itself may be of relatively small dimensions and simple construction so that the assemblage of the bearing is scarcely altered thereby and consequently the bearing with the adjusting device can be produced simply and cheaply. The arrangement of a screw spindle in a screw threaded bore of the bearing mounted in the casing and unshiftable, presents the additional advantage, that all movements of the bearing, that is all movements which are not caused by the turning of the spindle, are prevented, seeing that the spindle itself forms an additional guide arranged in spaced relationship to the casing guide and thus also opposes a skewing of the bearing.

The invention can be embodied in several constructions, the mounting of the spindle being dependent upon the type and the arrangement of the bearing in the machine casing. When the shiftable bearing is arranged in a groove of a bracket fixed on the casing cover, the bearing element according to the invention is provided with an arm having a screw threaded bore, which arm extends through a guide slot in the bracket and cooperates with a screw spindle which is unshiftably mounted in the bracket. A good and simple form of construction is also attained when the bearing is arranged shiftable and locked against rotation in a sleeve fixed on the casing cover, and when the bearing element has a screw threaded bore extending parallel to the bearing axis, and a spindle rotatably mounted and secured against rotation in the cover of the sleeve operating in this bore.

The spindle may be rotated by displacing the bearing by means of a hand wheel fixed on the end of the spindle. The spindle may also have some other drive, for example it may be coupled with a worm gear, instead of being provided with a hand wheel.

Two embodiments of the invention are illustrated by way of example in the accompanying drawing in which—

Figure 2:
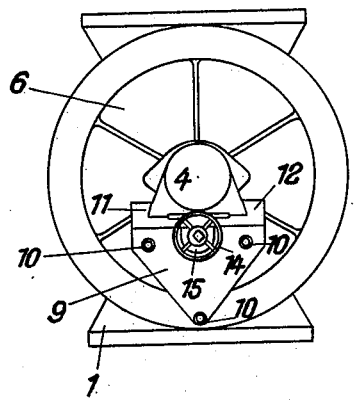
Figure 3:
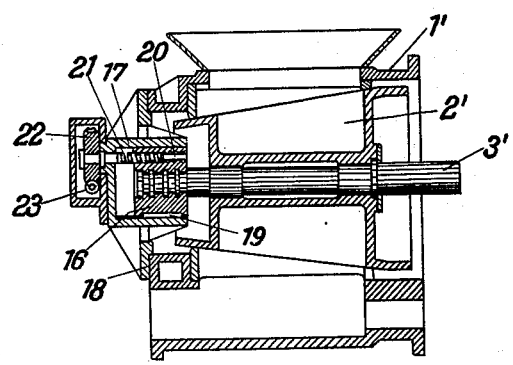

Fig. 1 shows in vertical longitudinal central section the first form of construction, Fig. 2 is an elevation showing the left end of the machine illustrated in Fig. 1, Fig. 3 is a vertical longitudinal central section through a second form of construction.

According to Figs. 1 and 2 a conical pocket wheel 2 is rotatably mounted in a casing 1 of a blower refuse machine and its shaft 3 rests in bearings 4, 5. The casing 1 is closed at its ends by covers 6 and 7. The bearing 4 is constructed as a neck journal bearing and surrounds at one end a collar 8 or the like on the shaft 3 of the pocket wheel 2.

The bearing 4 is carried by a bracket 9 detachably fixed on the cover 6 for example by means of bolts 10. The bearing 4 is axially adjustable in spaced dove-tail guides 11, 12 of the bracket 9. For this purpose a screw spindle 13 is non-shiftably mounted in the bracket 9 outside the pocket wheel shaft 3. This spindle 13 can be rotated by a hand wheel 14. It then shifts an arm 15 of the bearing 4 constructed as a nut and movable in the slot formed between the spaced guides 11 and 12, with the result that this bearing can be shifted backwards or forwards. As the bearing is constructed as a neck journal bearing the pocket wheel 2 will also participate in any displacement which can take place, even when the blower refuse machine is in operation.

The device according to Fig. 3 also comprises a casing 1' with conical pocket wheel 2' and shaft 3' which rests at one end in a collar thrust bearing 16. The collar thrust bearing is slidably mounted in a sleeve 17 on the casing cover 18 and secured against rotation by a key 19. Above the pocket wheel shaft 3' the bearing 16 has a screw threaded bore 20 in which a screw spindle 21 secured against displacement and journalled in the cover of the sleeve 17 rotates. For effecting the drive the spindle 21 has a worm wheel 22 meshing with a worm 23 which can be rotated by hand for example with the aid of a crank.

The shaft 3' is coupled with the bearing 16 in such manner that it participates in the axial movements of the bearing. In this form of construction the pocket wheel can also be shifted while the blower refuse machine is running.

I claim:

A device comprising in combination a casing, rigid guides on said casing arranged in spaced relation to provide a guide slot therebetween, a bearing axially shiftable and secured against rotation in said guides, a shaft journalled in said bearing and held against axial displacement therein, a conical pocket wheel rigidly carried by said shaft in said casing, a bracket on said casing, an arm on said bearing engaging said guide slot and having a screw threaded bore, and a screw spindle secured against axial displacement in said bracket and engaging in said screw threaded bore to axially displace said bearing with said shaft and said pocket wheel in both directions.

BERNHARD HOLTZMANN.